United States Patent [19]

Band

[11] Patent Number: 4,467,044

[45] Date of Patent: Aug. 21, 1984

[54] SUPPORTED CATALYST FOR POLYMERIZATION OF OLEFINS

[75] Inventor: Elliot I. Band, Yonkers, N.Y.

[73] Assignee: Stauffer Chemical Company, Westport, Conn.

[21] Appl. No.: 451,631

[22] Filed: Dec. 20, 1982

[51] Int. Cl.$^3$ ................................................ C08F 4/64
[52] U.S. Cl. .................................... 502/111; 502/120; 502/125; 502/127; 526/114; 526/125
[58] Field of Search ................ 502/111, 120, 125, 127

[56] References Cited

U.S. PATENT DOCUMENTS

| | | | |
|---|---|---|---|
| 3,135,809 | 6/1964 | Bosmaiian | 502/103 X |
| 4,071,674 | 1/1978 | Kashiwa et al. | 502/125 X |
| 4,087,380 | 5/1978 | Hyde | 502/111 |
| 4,097,409 | 6/1978 | Speakman | 502/120 |
| 4,226,741 | 10/1980 | Luciani et al. | 502/127 X |

*Primary Examiner*—Patrick Garvin
*Attorney, Agent, or Firm*—Henry Z. Friedlander; Vivienne T. White

[57] ABSTRACT

This invention comprises a catalytic component for polymerizing olefins comprising a siliceous support containing magnesium halide, a transition metal halide, and an electron donor obtained by steps comprising:
 (a) infusing siliceous oxide with magnesium halide complexed with an alcohol to form a support;
 (b) reacting the support with an organometallic compound of a metal from Groups I to III of the periodic table to form an intermediate;
 (c) reacting the intermediate complex with an electron donor to form an intermediary complex; and
 (d) reacting the intermediary complex with a fluid comprising a transition metal halide.

14 Claims, No Drawings

SUPPORTED CATALYST FOR POLYMERIZATION OF OLEFINS

BACKGROUND OF THE INVENTION

This invention relates to the polymerization of olefins by the coordinate complex method, often termed the Ziegler-Natta method after the names of the two workers who contributed so much to its practical development and theoretical basis. More particularly, this invention relates to novel, activated supports for the transition metal catalytic component.

About 30 years ago the original Ziegler-Natta catalysts were heterogeneous slurries formed in place when solutions of organometallic cocatalysts, preferably taken from the compounds of metals of Groups IA, IIA, and IIIA of the periodic table, were added to solutions of transitional metal catalysts, preferably taken from compounds of metals of Groups IIIB, IVB, and VB of the periodic table. These catalytic systems by today's standards did not have high activity in terms of grams polyolefins produced per gram catalyst component. Nor, when propylene or other monomers capable of giving polymers with tacticity were employed, did these early catalytic systems provide polymer with high isotactic index. Also, the particle size distribution of the polyolefin was too broad, leading to an undesirable fraction of "fines", particles less than about 100–180 μm.

More recently, high activity, high isotactic index, and enhanced particle size have been achieved by employing catalyst supports on which catalytic transition metals have been dispersed. It has been theorized that the concentration of active polymerization centers is as much as 50 percent higher on supported catalysts than unsupported catalyst systems. These developments are discussed in the Kirk-Othmer "Encyclopedia of Chemical Technology", third edition, vol. 16, pp. 453–469 in an article entitled Olefin Polymers (Polypropylene) and in Angewandte Makromolekulare Chemie, 94, 63–89 (1981). One support which has gained favor in technical circles is magnesium halide, particularly in an activated condition. The preferred method for activating catalyst support such as magnesium halide is dry milling, as disclosed in British Pat. No. 1,335,887.

Dry milling suffers from many practical defects. Among these are long milling regimes, losses of support by "hold-up" in the milling equipment, excessive handling, the cost of milling energy, and a wide dispersion of the particle size of the milled products leading to excessively broad particle size distribution of the polyolefin. It would be advantageous to have the high catalytic activity of a supported catalyst, the high isotacticity of polymers capable of such (e.g., polypropylene) and a decreased proportion of "fines" without the necessity of a milling or grinding step. This is achieved by use of the present invention.

U.S. Pat. No. 4,071,674 discloses a transition metal catalyst component prepared by reacting a titanium or vanadium compound with the reaction product formed between an alcohol-adduct of a magnesium dihalide solid carrier and an organometallic compound of a metal of Groups I to III. No additional electron donors are employed in the process of that disclosure, and pulverization by means of a ball mill may be used.

In U.S. Pat. No. 4,076,924 a process is disclosed for preparing a solid titanium catalyst by first reacting a magnesium dihalide, an organic ester, an organic compound containing an active hydrogen atom, and an organometallic compound. Then the solid is treated with a titanium compound in the absence of the organometallic compound of a metal of Groups I to III of the periodic table.

U.S. Pat. No. 4,097,409 discloses a process for producing a supported Ziegler catalyst by treating a support, obtained by heating a magnesium halide or alkoxide with silica, with a titanium compound containing halogen.

In U.S. Pat. No. 4,226,741 at Example 15 magnesium chloride suspended in an inert hydrocarbon is treated with ethanol, then caused to react with a phenol plus ethyl benzoate, plus diethyaluminum chloride. After separation it is treated with titanium tetrachloride, filtered, washed, and dried to produce a component for the polymerization of propylene.

OBJECT OF THE INVENTION

It is an object of this invention to prepare a supported, active, catalytic component for polymerizing olefins, alone or in mixtures, to polymers of high stereoregularity without employing a milling or grinding step. Other objects of the invention will be apparent to those skilled in the art.

SUMMARY OF THE INVENTION

Surprisingly, it has been found that an effective, supported, catalytic component for coordinate complex (Ziegler-Natta) polymerization of olefins, such as propylene, results from the following process:

(a) a siliceous oxide is infused with the complex of a magnesium halide with an alcohol to form a support;

(b) the support is caused to react with an organometallic compound of a metal from Groups I to III of the periodic table to form an intermediate;

(c) the intermediate is caused to react with an electron donor to form an intermediary complex; and (d) the intermediary complex is caused to react with a fluid comprising a transition metal halide to produce the component.

DETAILED DESCRIPTION OF THE INVENTION

The starting material for the support for the catalyst of the present invention is a siliceous material which can be silica, itself, or an aluminosilicate such as clay. The support can be a synthetic material, such as silica gel, or a natural material, such as kaolin or diatomaceous earth. It is preferred that the support be microporous, that is foraminous in structure, rather than discrete. Surface area in $m^2/g$ is a good measure of porosity. If a material has a surface area greater than about 25 $m^2/g$, it may be considered microporous. Preferably the starting material for preparing the catalyst of the present invention has a surface area greater than 100 $m^2/g$.

The shape of the siliceous particles for preparing the support of this invention can be irregular, beadlike, or layered as in montmorillonite. The preferred material is spherical, microporous silica. The aluminum content can range from about zero to about 50 percent.

The other starting material for preparing the support for the catalyst of this invention is a magnesium or manganese compound containing halogen. Magnesium compounds containing halogen are preferred over their manganese analogues. The preferred second starting material is anhydrous magnesium dichloride, but other material, such as magnesium oxychloride, magnesium alkoxychloride, magnesium bromide, magnesium oxybromide, magnesium alkoxybromide, manganese chloride, manganese bromide, manganese oxybromide, manganese oxychloride, or manganese alkoxyhalide may be chosen. Mixtures of magnesium or manganese compounds containing halogen may be employed.

The third component of the requisite materials for the first step in preparing the catalyst of the present invention is an alcohol. Any alcohol capable of complexing with the magnesium or manganese compound containing halogen is satisfactory. The alcohol may be alkyl, cycloalkyl, arylalkyl or a mixture of these types. Preferably the alcohol contains 2 to 16 carbon atoms.

Representative alcohols from which the complexing agent for forming a soluble complex with the magnesium or manganese compound containing halogen may be chosen are: methyl, ethyl, propyl, butyl, hexyl, 2-ethylhexyl, octyl, nonyl, dodecyl, benzyl, cyclohexyl, furfuryl, cinnamyl, allyl, or diphenylmethyl alcohol. A low-boiling alcohol is preferred, so that the complex between the alcohol and the magnesium and/or manganese compound containing halogen can be made ready for further processing by evaporation of the excess alcohol. A low-boiling alcohol is also preferable so that its complex with the metal halide can easily infuse the pores of the siliceous or aluminosiliceous substrate material.

The magnesium or manganese compound containing halogen can complex with two, four, six, or more alcohol molecules. It is not necessary that the complex between the metal halide and alcohol be of any particular structure. A complex between a magnesium compound containing halogen and six alcohol molecules is preferred. For mixing with or infusing the siliceous or aluminosiliceous substrate of the present invention a complex between magnesium chloride and six ethanol molecules is especially preferred. The support is formed from these three materials.

The second step (b) in the preparation of the catalyst of the present invention is treatment of the mixed or infused siliceous/metal halide/alcohol support material with an organometallic reagent whose metal is a member of Groups I, II, or III of the periodic table of the elements. The exact chemical reaction taking place between the support material and the organometallic reagent is not known. It may be reaction between the organometallic reagent and any hydroxy groups on the surface of the siliceous material. It may be reaction with hydroxyl groups of the metal halide/alcohol complex. It may be reaction with any adventitious water molecules present, so that the organometallic reagent functions only as a chemical drying agent for the support material. Regardless, it is not necessary for the carrying out of the present invention to know the chemistry of the reaction between the support material and the organometallic reagent.

It is advantageous to employ a solution of the organometallic reagent dissolved in an inert hydrocarbon or halogenated hydrocarbon such as hexane, heptane, benzene, or methylene dichloride. The reaction between the support material and the organometallic reagent can be carried out at any temperature from about 0° C. to about 180° C. A reaction temperature from about 75° to about 125° C. is preferred. Depending inversely on the temperature, the length of reaction time for the second step can vary from about one hour to about eight hours. At a reaction temperature of from 75° to 125° C. a reaction time, inversely, of about one to about three hours is preferred.

The organometallic reagent may be an alkyl-, aryl-, or cycloalkyl-substituted organometallic compound containing an alkali metal, an alkaline earth metal or a Group IIB or Group IIIB metal. Organometallic reagents containing aluminum, magnesium, zinc, cadmium, mercury, lithium, potassium, or sodium are preferred. Alkyl derivatives of aluminum are especially preferred. The alkyl, cycloalkyl, or aryl derived metallic reagents may be substituted with halogen or have direct metallohalogen bonds. The preferred halogen substituent or derivative is of chlorine. The organometallic reagent may also bear alkoxy or aryloxy groups.

Representative compounds from which the preferred organoaluminum reagent may be chosen are: trialkylaluminums such as triethylaluminum, triisobutylaluminum, and trihexylaluminum, dialkylaluminum halides such as diethylaluminum chloride, diethylaluminum bromide, and dibutylaluminum chloride; alkylaluminum sesquihalides such as ethylaluminum sesquichloride, alkylaluminum dihalides such as ethylaluminum dichloride, ethylaluminum difluoride, and butylaluminum dichloride, and dialkylaluminum alkoxides such as diethylaluminum ethoxide, diethylaluminum butoxide, and diethylaluminum phenoxide. Corresponding derivatives of metals from Groups I, II, and III of the periodic table may also serve as the organometallic reagent.

The third step, (c), in the process for producing the catalyst of the present invention is reacting the intermediate formed by treatment with an organometallic reagent with an electron donor to form an intermediary complex. Electron donors, also known as Lewis bases, are organic compounds of oxygen, nitrogen, phosphorus, or sulfur which can donate an electron pair to the catalyst support or a compound combined with the catalyst support. Electron donors can be either reactive or non-reactive types of compounds. Some reactive types of electron donors are organic acids, carboxylic esters, acid chlorides, alcohols or amines. Some non-reactive types of donors are ethers, polysiloxanes, thioethers, or nitriles.

If a non-reactive electron donor is employed, then the reaction with the electron donor, step (c), can be performed simultaneously with or even before step (b), reaction with the organometallic reagent. If a reactive electron donor is used, then this reaction should not be carried out simultaneously with step (b), because the organometallic reagent may react with the electron donor. For example, triethylaluminum would react with ethyl benzoate but not with polysiloxane.

Among the classes of compounds containing oxygen suitable for furnishing electron-donors are: aliphatic and aromatic ethers, aliphatic carboxylic esters, aromatic carboxylic esters, cyclic esters of carbonic acid, alcohols, aldehydes, ketones, aliphatic and aromatic carboxylic acids, lactones, and carboxylic acyl halides.

Among the classes of compounds containing nitrogen suitable for furnishing electron-donors are: aliphatic amines and polyamines, aromatic amines, heterocyclic amines, nitriles, carbamates, aromatic isocyanates, and aromatic azo compounds. Electron-donors containing both oxygen and nitrogen atoms may be used such as aliphatic and aromatic amides, nitro compounds, or guanidine and its alkyl-substituted derivatives.

Other classes of electron-donors include phosphines, phosphoroamides, sulfides, mercaptans, thioethers, thioesters, organosilicon isocyanates, and polysilazines.

Examples of electron-donor compounds from some of the classes listed above are: ethyl benzoate, ethyl anisate, ethyl toluate, ethyl acetate, diethyl carbonate, γ-butyrolactone, acetone, acetophenone, nitrobenzene, veratrol, tetramethylenediamine, dimethyl acetamide, methyl carbamate, toluene diisocyanate, benzonitrile, N-methyl pyrrolidone, and thiophenol. Especially preferred among these electron-donors is ethyl benzoate.

The reaction with an electron donor is preferably carried out at an elevated temperature, such as from about 50° to about 220° C. It is often advantageous to carry out the reaction in an inert solvent such as a hydrocarbon or a halogenated hydrocarbon. It is convenient to carry out the reaction with the electron donor at reflux if the electron donor is a liquid or if a liquid inert solvent is employed, especially if the reflux temperature is at 80° C. or higher. For the preferred ethyl benzoate the reflux temperature is about 210° C.

Depending inversely on the temperature of the reaction with the electron donor the preferred time ranges from about one to about eight hours. A more preferred reaction time for this step of reaction with an electron donor is about three to four hours.

It is advantageous to wash the catalytic intermediate with an inert solvent such as heptane both before and after reaction with the electron donor, unless, of course, reaction with a non-reactive electron donor is carried out simultaneously with treatment with an organometallic reagent. If the two steps (b) and (c) are carried out together then the washing with inert solvent, filtering, and vacuum-drying are carried out at the end of the combined steps.

Once a treatment step has been carried out with an organometallic reagent, the catalyst intermediate is sensitive to moisture and the oxygen in air. Therefore, it should be kept and handled in an inert atmosphere thereafter. Dry nitrogen or argon are examples of inert gases. Use of a gloved dry box is convenient for handling and storage of the catalyst or intermediates.

The fourth and final step, (d), in the preparation of the novel, supported catalyst component of the present invention is reaction with a fluid comprising a transition metal halide. Titanium is the preferred transition metal, and titanium tetrahalide, neat or in a solution of an inert organic solvent, is the preferred halide. Examples of inert solvents are heptane, toluene, chlorobenzene, and kerosene.

The preferred transition metals to be bound onto the catalyst support are titanium, vanadium, and zirconium, but other metals from groups IVB and VB of the periodic table may be employed. Any liquid or gaseous compound containing at least one transition metal-halogen bond may be used to bind the transition metal ion to the treated, complexed catalyst support. Chlorine is the preferred halogen, but compounds of bromine or iodine may also be used. Liquid compounds containing transition metal-halogen bonds are preferred to gases. Solid compounds may be employed, if they are soluble in inert solvents.

Examples of preferred specific titanium halide compounds which may be used are: $TiCl_4$, $TiBr_4$, $TiI_4$, $Ti(OC_3H_7)Cl_3$, $Ti(OC_6H_5)Cl_3$, $Ti(OC_4H_9)_2Cl_2$, $Ti[OC(CH_3)=CHCOCH_3]Cl_2$, $Ti[N(C_2H_5)_2]Cl_3$, and $Ti(C_6H_5COO)Cl_3$. Analogous halogen-metal compounds of V, Zr, and niobium may also be employed.

The amount of transition-halide metal fluid compound used ranges from about 0.1 mole to about 2 moles per mole Mg or Mn in the support material, when the transition metal halide is dissolved in an inert solvent. When the transition metal halide is employed as a liquid, neat, or in the form of a gaseous stream then it will normally be in large stoichiometric excess.

The temperature of reaction between the intermediary complex resulting from steps (b) and (c) with the transition metal halide in step (d) ranges from about ambient temperature to about 180° C. The preferred range is from about 80° C. to about 137° C., the boiling point of $TiCl_4$ at atmospheric pressure.

The time of reaction step (d) varies inversely with temperature from about one hour to about eight hours. From about two to about three hours reaction time is preferred.

Normally, after the reaction has been completed, the catalyst is filtered, washed one or more times with the solvent of the reaction, if one has been used, and then several times with a volatile solvent such as heptane before drying under reduced pressure. It is advantageous to wash the separated catalyst with enough solvent so that the filtrate is free of halogen before vacuum drying.

After preparation the catalyst of the present invention should be kept and handled in a dry, inert atmosphere, such as nitrogen, before use.

The product of the present invention will normally contain from about one percent to about ten percent by weight of transition metal.

The catalytic component of the present invention is broadly applicable to the polymerization of monomeric olefins including 1-olefins such as ethylene and propylene, dienes, especially conjugated dienes such as butadiene, and those other olefins which are only polymerized with difficulty, such as 2-butene. The preferred monomeric olefins are those corresponding to the formula $R-CH=CH_2$, wherein R is an alkyl radical containing up to 12 carbon atoms inclusive and hydrogen. Among the preferred monomeric olefins are ethylene, propylene, 1-butene, 1,4-butadiene, 1-pentene, 4-methyl-1 pentene, 1-hexene, and the like. These monomers may be employed individually or in comonomeric mixtures such as ethylene/propylene, ethylene/propylene/butadiene, and the like. The term "monomeric olefin" means those olefins which can undergo addition polymerization alone or with comonomers.

Although for illustrating the present invention, the polymerization of propylene is described herein as an example, the invention is by no means limited to any one monomeric olefin.

The organometallic compound for the necessary cocatalyst, may be an organometallic compound known to those skilled in the art of coordinate complex polymerization as useful. Included are organocompounds of zinc, mercury, magnesium, cadmium, boron, gallium and other metals of Groups IA, IIA, and IIIA of the periodic table of elements. The preferred organometallic compounds are those of aluminum, especially trialkylaluminums.

The molar ratio of trialkyl aluminum or other cocatalyst to the novel catalyst of the present invention may range from about 1000:1 to about 1:1, preferably about 200:1 to about 10:1.

An electron donor may be employed in the cocatalyst component with the organometallic compound. Oxygen compounds are preferred donors, especially alkyl esters of aromatic carboxylic esters. Methyl toluate, ethyl anisate, ethyl benzoate, and dibutyl phthalate, are examples of such preferred electron donors (Lewis bases) for the cocatalyst component.

The electron donor employed in conjunction with the cocatalyst may be advantageously used in a molar ratio from about 1:15 to about 1:1 with respect to the cocatalyst (e.g., trialkylaluminum).

After having described the preparation of the novel polymerization catalyst of the present invention above, the following Examples illustrate but do not limit its utility. Many variations of these Examples can be carried out by those skilled in the art of coordination complex polymerization within the scope of this invention.

EXAMPLE 1

This Example illustrates preparation of the novel catalytic component of the present invention.

Into a flask was added 4.0 g. of spherical, high-porosity silica with a pore volume of about 1.8–3.5 cc/g. and a surface area 200–500 m$^2$/g and 3.3 g. $MgCl_2$ in 30 ml. 3A denatured ethanol. The solvent was evaporated under vacuum until six equivalents of ethanol remained for each equivalent of $MgCl_2$. This infused support was then bottled in four separate vials of about four grams each.

A 3.55-g. sample of infused silica support was then heated at 100° for two hours in 30 ml of a 25 percent solution of triethylaluminum in heptane. A brief, vigorous reaction took place upon addition. After cooling, separation with filtration, four washings with heptane, and vacuum-drying the white intermediate weighed 3.25 g.

The intermediate was then treated at reflux with six ml. ethyl benzoate for three hours, again filtered, washed, and vacuum-dried with no change in weight to form the intermediary complex.

The intermediary complex was then treated with 50 ml neat $TiCl_4$ at 100° C. for two hours, filtered, washed, and vacuum-dried as above to form a beige-colored final catalyst containing 4.37 percent titanium.

COMPARATIVE EXAMPLE 1

This Comparative Example illustrates the preparation of a catalytic component with the omission of the treatment with ethyl benzoate electron-donor.

Another one of the four vials of the second paragraph of Example 1 containing a sample of the infused support was treated with triethylaluminum, as in Example 1, and then with $TiCl_4$, as in Example 1, but without the treatment with an electron donor. This product was colored dark yellow and was visibly heterogeneous in particulate form and color.

EXAMPLE 2

This Example illustrates the use of the catalytic component of the present invention to polymerize propylene by the slurry method.

The novel component containing titanium is air and moisture sensitive. Thus during preparation, storage, and use it should be kept in an inert atmosphere (e.g., nitrogen, argon) containing less than 5 ppm oxygen and less than 5 ppm moisture. The preferred cocatalyst methyl toluate or ethyl anisate are hydroscopic and should also be handled in a moisture-free environment. All reagents should be of polymerization grade.

Into a 4.5 L. stirred reactor equipped with a heater, means for temperature control, gas inlet and outlet lines are added in order 2 L. heptane, 12 mmole triethylaluminum, 0.54 g of methyl p-toluate, 30 mg of the novel catalyst prepared in Example 1, and 3.2 psi (1/5 atmosphere) of hydrogen as a polymerization moderator. The reactor is stirred at 600 rpm, held at 65° C. Then polymerization grade propylene is introduced and maintained at 10 atmospheres for 1.5 hours, whereupon this polymerization is stopped by venting the gases and pouring the contents of the reactor into alcohol. Filtering and vacuum-drying steps are carried out in the usual manner.

Catalytic activity is defined as the grams of total polymer produced both soluble and insoluble in the polymerization medium per gram of catalytic component. For the product of Example 1 the activity was 2088. For the product of the Comparative Example 1 the activity was less than 200.

Isotactic Index is defined as the weight percent of the total polymer produced which is insoluble in refluxing heptane after three hours. For the polymer made by the catalyst of Example 1 this was 72.3 percent; for the polymer made by the catalyst of Comparative Example 1 the value was not determined due to the small amount of polymer.

COMPARATIVE EXAMPLE 2

This Comparative Example illustrates the preparation of a catalytic component of the present invention except that step (b), reacting the support with an organometallic compound of a metal from Groups I to III of the periodic table is omitted.

To a 5.0-g aliquot of the high porosity silica of Example 1 was added 3.3 g $MgCl_2$ dissolved in 28 ml ethanol. The ethanol was evaporated under pressure until three equivalents of ethanol remained for each equivalent of $MgCl_2$. Then 50 ml heptane containing 12 ml benzoyl chloride was added to the infused support and the mixture heated at 100° C. for four hours without visible reaction. Subsequently 10 ml $SiCl_4$ was added without apparent reaction.

The reaction mixture was then separated by filtration, the solid washed five times with heptane, and vacuum-dried. Then the purified solid was treated with 50 ml neat $TiCl_4$ at 100° C. for three hours, filtered, washed with heptane, and vacuum-dried to form a yellow catalyst component.

A polymerization of propylene was carried out as in Example 2 employing this component, yielding an activity of less than 200 g PP/g cat and too little polymer to measure an Isotactic Index.

EXAMPLE 3

This Example illustrates the more narrow size distribution of the particles of polyolefin produced from the catalytic component of the present invention.

A sample of polypropylene prepared from a catalyst component made as in Example 1 was wet-sieved in ethanol by the procedure of ASTM STP 447A (1977). This sample is termed Example 3.

Another catalytic component was prepared as a control by the procedure of Example 1 except that no silica was employed. A sample of polypropylene was produced from this control catalytic component and termed Example 3-C. This polymer was also wet-sieved by the same ASTM method as sample 3.

The results of the wet-sieving are given in the Table below. One notices that there are fewer "fines" (<180 μm), no coarse polymer particles (>4750 μm), and a sharper distribution in the particle size distribution of the polypropylene prepared by the method of the present invention, compared to that of the control sample.

TABLE

| | Particle Size Distribution | |
|---|---|---|
| Size (μm) | Present Invention Wgt. % - Sample 3 | Control Wgt. % - Sample 3-C |
| <45 | 0.62 | 0.45 |
| 45–75 | 0.53 | 0.54 |
| 75–180 | 0.88 | 3.43 |
| 180–425 | 1.06 | 11.01 |
| 425–850 | 6.98 | 17.06 |
| 850–1700 | 49.91 | 17.78 |
| 1700–2360 | 37.37 | 9.39 |
| 2360–4750 | 2.60 | 24.46 |
| >4750 | none | 15.88 |

The present invention having been illustrated but not limited by the Examples above, the inventor asserts that other variations can be carried out within the scope of this disclosure, which he seeks to protect by the following claims for letters patent.

I claim:

1. A catalytic component for polymerizing olefins comprising a siliceous support containing magnesium halide and/or manganese halide, a transition metal halide, and an electron donor obtained by steps comprising:
    (a) infusing siliceous oxide with magnesium halide and/or manganese halide complexed with an alcohol to form a support;
    (b) reacting the support with an organometallic compound of a metal from Groups I to III of the periodic table to form an intermediate;
    (c) reacting the intermediate with an electron donor to form an intermediary complex; and
    (d) reacting the intermediary complex with a fluid comprising a transition metal halide.

2. A catalytic component as in claim 1 wherein the transition metal is titanium.

3. A catalytic component as in claim 1 wherein the siliceous support is microporous silica.

4. A catalytic component as in claim 1 wherein the electron donor is an ester of an aromatic carboxylic acid.

5. A catalytic component as in claim 1 wherein the magnesium halide is magnesium chloride.

6. A catalytic component as in claim 1 wherein the organometallic compound is a compound of aluminum.

7. A catalytic component as in claim 1 wherein the siliceous support is a spherical microporous silica with a surface area greater than 200 $m^2/g$, the magnesium halide is magnesium chloride, the transition metal halide is titanium tetrachloride, the electron donor is ethyl benzoate, the organometallic compound is a trialkylaluminum, and the alcohol is ethanol.

8. A process for preparing a catalyst for polymerizing olefins comprising the steps of:
    (a) infusing siliceous oxide with magnesium halide and/or manganese halide complexed with an alcohol to form a support;
    (b) reacting the support with an organometallic compound of a metal from Groups I to III of the periodic table to form an intermediate;
    (c) reacting the intermediate with an electron donor to form an intermediary complex; and
    (d) reacting the intermediary complex with a fluid comprising a transition metal halide.

9. A process as in claim 8 wherein the transition metal is titanium.

10. A process as in claim 8 wherein the siliceous support is microporous silica.

11. A process as in claim 8 wherein the electron donor is an ester of an aromatic carboxylic acid.

12. A process as in claim 8 wherein the magnesium halide is magnesium chloride.

13. A process as in claim 8 wherein the organometallic compound is a compound of aluminum.

14. A process as in claim 8 wherein the siliceous support is a spherical microporous silica with a surface area greater than 200 $m^2/g$, the magnesium halide is magnesium chloride, the transition metal halide is titanium tetrachloride, the electron donor is ethyl benzoate, the organometallic compound is a trialkylaluminum, and the alcohol is ethanol.

* * * * *